(12) United States Patent  
 Bagchi et al.

(10) Patent No.: US 9,137,341 B1  
(45) Date of Patent: Sep. 15, 2015

(54) APPARATUS AND METHOD FOR COMMUNICATING TRANSMIT PARAMETERS TO A DATA TRANSMITTER

(75) Inventors: Sonali Bagchi, San Jose, CA (US); Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 1432 days.

(21) Appl. No.: 11/870,158

(22) Filed: Oct. 10, 2007

Related U.S. Application Data (60) Provisional application No. 60/828,889, filed on Oct. 10, 2006.

(51) Int. Cl.
| | |
|---|---|
| *H04W 28/18* | (2009.01) |
| *H04L 29/06* | (2006.01) |
| *H04W 28/02* | (2009.01) |
| *H04L 29/14* | (2006.01) |
| *H04L 12/26* | (2006.01) |

(52) U.S. Cl.  
 CPC ............ *H04L 69/24* (2013.01); *H04L 43/0847* (2013.01); *H04L 69/40* (2013.01); *H04W 28/0231* (2013.01); *H04W 28/18* (2013.01)

(58) Field of Classification Search  
 CPC ............. H04W 28/18; H04W 28/0231; H04L 43/0847; H04L 69/24; H04L 69/40  
 USPC ........................................................ 709/230  
 See application file for complete search history.

(56) References Cited

U.S. PATENT DOCUMENTS

| | | | |
|---|---|---|---|
| 5,950,191 A * | 9/1999 | Schwartz ....................... 707/758 |
| 6,009,553 A * | 12/1999 | Martinez et al. .............. 714/784 |
| 6,556,552 B1 * | 4/2003 | Nakagomi et al. ............ 370/332 |
| 7,272,156 B2 * | 9/2007 | Shoemake et al. ............ 370/469 |
| 7,512,097 B2 * | 3/2009 | Jelitto et al. .................. 370/329 |
| 2001/0012271 A1 * | 8/2001 | Berger .......................... 370/230 |
| 2003/0031208 A1 * | 2/2003 | Anehem et al. ............... 370/474 |
| 2004/0008716 A1 * | 1/2004 | Stiliadis ........................ 370/429 |
| 2004/0158754 A1 * | 8/2004 | Walls et al. ................... 713/323 |
| 2006/0018288 A1 * | 1/2006 | Luo et al. ...................... 370/334 |
| 2006/0259627 A1 * | 11/2006 | Kellerer et al. ............... 709/227 |
| 2008/0219150 A1 * | 9/2008 | Kagan et al. .................. 370/218 |

* cited by examiner

*Primary Examiner* — Aaron Strange (57) ABSTRACT

A system and method are disclosed for communicating transmit parameters to a data transmitter for transmitting a data frame. Two or more levels of transmit parameters are associated with each data frame and are accessible and adjustable by a processor, such as a firmware processor. A data transmitter retrieves the transmit parameters of a level only if all attempts (initial attempt and retransmissions) at the previous level were unsuccessful. Each level includes a continuation data element, such as a designated bit, to indicate to the data transmitter that a subsequent level exists. The processor may adjust the transmit parameters in a transmit control table and may add levels of transmit parameters to the transmit control table based on transmission performance information.

20 Claims, 7 Drawing Sheets

APPARATUS AND METHOD FOR COMMUNICATING TRANSMIT PARAMETERS TO A DATA TRANSMITTER

RELATED APPLICATION

This application claims the benefit of U.S. Provisional Application No. 60/828,889, filed on Oct. 10, 2006, which is incorporated herein by reference.

BACKGROUND

1. Technical Field

The present disclosure relates to the field of data communication, and more particularly to communicating to a data transmitter transmit parameters for transmitting data.

2. Related Art

Devices such as cell phones, personal digital assistants, computers, peripheral devices, and many other devices communicate data by transmitting data frames. A data frame is a data packet that includes the data to be transmitted along with a header. The data is the payload and the header includes supplemental information for processing the payload.

A transmitting device typically includes a processor (to execute transmit software) and transmit hardware (i.e., a data transmitter) for executing transmission attempts for each data frame. For transmitting a data frame, the processor communicates the data frame to a queue of the transmit hardware. Transmit data associated with each data frame is communicated along with the data frame and stored in a buffer. The transmit data includes transmit parameters that define characteristics of the transmission attempt(s) for the data frame. The transmit parameters may define the transmit rate, the bandwidth of the transmission, the modulating scheme, the transmission media, and/or other transmission characteristics for the respective data frame.

The transmitting device provides for multiple transmission attempts in the event that an acknowledge (ACK) signal is not received from the receiving device after a data frame is sent. To increase the likelihood of a successful transmission, the transmit data for each data frame includes not just one but multiple sets of varied transmit parameters. If a transmission attempt consistently fails using a first set of transmit parameters, a subsequent attempt may be made using a second, different transmit parameter set. Transmit data may include up to ten or more different transmit parameter sets to increase the likelihood that a data frame will be received. The number of transmit parameter sets in the transmit data is fixed and all of the transmit parameter sets (e.g., ten parameter sets) are communicated to the buffer when a data frame is queued for transmission.

The process of communicating the transmit data to the buffer includes the read/write operations that are executed to write all of the transmit parameter sets to the buffer for each queued frame. This process may be relatively inefficient under many circumstances. Consider, for example, that a data frame may be successfully sent on the first (or early) attempt. In that case, a majority of the time and resources that were used to write all of the transmit parameter sets to the buffer were unnecessary overhead for transmitting the data frame. Also, a transmitting device typically includes several queues. Therefore, the total inefficiency is a multiple of the number of queues because each queue has an associated memory block in the buffer; all of the transmit parameter sets for each queued data frame are written to the memory blocks regardless of whether they will be utilized. A further shortcoming of this process is that it does not allow a transmit parameter to be adjusted within any transmit parameter set (even those not currently being used) once the transmit data is written to the buffer. An improved approach is desirable.

BRIEF SUMMARY

The following embodiments relate to systems and methods of writing transmit data to a buffer memory in communication with a data transmitter. The transmit data is comprised of transmit parameter levels. The number of levels of transmit parameters that comprise the transmit data may be increased as needed to improve the performance of the data transmitter. Adding levels to the transmit data only as needed provides an efficient use of the buffer memory and other system resources.

In an exemplary embodiment, a first level of transmit parameters, associated with a data frame, is retrieved by a data transmitter from a buffer. The data transmitter is configured to transmit the data frame in accord with the first level of transmit parameters. The data transmitter may retransmit the data frame using the first level of transmit parameters. The data transmitter retrieves a second level of transmit parameters from the buffer only if an acknowledge signal is not received in response to transmitting and retransmitting (up to a predetermined number of retries) the data frame using the first level of transmit parameters. In that case, the data transmitter is configured to transmit the data frame in accord with the second level of transmit parameters.

The number of transmit levels in transmit data may be increased based upon the performance of the data transmitter. Adjusted transmit data may be written to the buffer at any time, including while the data transmitter is using a transmit level of the (pre-adjusted) transmit data. A table version bit, included with the adjusted transmit data, indicates whether the transmit data has been adjusted.

The first level of transmit parameters may include a continuation bit to indicate to the data transmitter that the transmit data includes the second level of transmit parameters. Other levels may also include a continuation bit to indicate that a subsequent level exists.

The system may implement a method that includes incrementing a transmit level count each time a data frame is transmitted in accord with the first level of transmit parameters. The transmit level count may be compared to a transmit count that indicates the maximum number of transmit attempts allowed at the first level. If the transmit level count is equal to the transmit count, a continuation bit of the first level of transmit parameters is read by the data transmitter to determine whether a transmit control table (i.e., the transmit data comprising the transmit parameter levels) includes a second level of transmit parameters.

The system may also implement a method that includes queuing a transmit frame for transmission by the data transmitter and selecting the transmit frame for transmission by the data transmitter. The transmit frame includes a first pointer to a first memory location having a data frame. A transmit information header of the transmit frame is read to obtain transmit data and a second pointer to a second memory location in the buffer. The second memory location may include the first level of transmit parameters. The method may further include reading the transmit information header of the transmit frame to obtain a transmit level that indicates a current retry level of the transmit control table, and determining a memory location of the current retry level of transmit parameters based on the second pointer and the transmit level.

According to another aspect of the invention, transmit data is written to a memory in communication with a data transmitter, the transmit data is adjusted, and the adjusted transmit data is written to the memory while a data frame is queued by a data transmitter for transmission in accord with the transmit data. The transmit data may be adjusted by adding a level of transmit parameters to the transmit data. After a transmission attempt, transmit performance information may be determined based on transmit information, and the transmit data may be adjusted. A field in the transmit data may be adjusted to indicate that the transmit data has been adjusted.

According to yet another aspect of the invention, a computer readable storage medium includes processor executable instructions to execute one or more of the following: adjust transmit data that includes a first level of transmit parameters and a second level of transmit parameters while a data frame is queued; adjust the transmit data by adding additional levels to the transmit data; adjust the second level of transmit parameters while the data frame is queued for transmission in accord with the first level of transmit parameters, and record an indication that the second level of transmit parameters has been adjusted; add an additional level of transmit parameters to a transmit control table having the first and second levels of transmit parameters and write the transmit control table to the buffer, including the additional level.

According to another aspect of the invention, an apparatus includes one or more of: means for transmitting a data frame in accord with a first level of transmit parameters retrieved from a memory; means for retrieving a second level of transmit parameters from the memory only if an acknowledge signal is not received in response to transmitting the data frame in accord with the first level of transmit parameters; means for configuring the data transmitter to transmit the data frame in accord with the second level of transmit parameters; means for adjusting transmit data associated with a data frame while a data frame is queued; means for determining whether transmit data has a second level of transmit parameters; means for adjusting a second level of transmit parameters while a data frame is queued for transmission in accord with a first level of transmit parameters, and recording an indication that the second level of transmit parameters has been adjusted; means for incrementing a transmit level count of first level transmit attempts, comparing the transmit level count to a transmit count, and determining whether a transmit control table includes the second level of transmit parameters only if the transmit level count is equal to the transmit count; means for queuing a transmit frame for transmission by the data transmitter, selecting the transmit frame for transmission by the data transmitter, reading a transmit information header of the transmit frame to obtain transmit data and a second pointer to a second memory location in the buffer, reading the transmit information header of the transmit frame to obtain a transmit level that indicates a current retry level of a transmit control table, and determining a memory location of the current retry level based on the second pointer and the transmit level; and means for adding an additional level of transmit parameters to a transmit control table and writing the transmit control table to memory.

According to yet another aspect of the invention, an apparatus includes one or more of: means for writing transmit data to a memory in communication with a data transmitter, adjusting the transmit data, and writing the adjusted transmit data to the memory while a data frame is queued by a data transmitter for transmission in accord with the transmit data; means for adding a level of transmit parameters to the transmit data; means for communicating to the memory transmit information related to the first set of transmit parameters; means for determining transmit performance information based on the transmit information and adjusting the transmit data based on the transmit performance information, and writing the adjusted transmit data to the memory; means for changing a field in the transmit data to indicate that the transmit data has been adjusted; means for disregarding the transmit performance information if the field indicates that the transmit data has been adjusted; and means for determining whether transmit data was adjusted while a data frame was queued.

According to another aspect of the invention, a computer readable storage medium includes processor executable instructions to write transmit data to a memory in communication with a data transmitter, adjust the transmit data, and write the adjusted transmit data to the memory while a data frame is queued by a data transmitter for transmission in accord with the transmit data. The computer readable storage medium may also include processor executable instructions to execute one or more of the following: add a level of transmit parameters to the transmit data; determine transmit performance information based on transmit information received from a data transmitter, adjust the transmit data based on the transmit performance information, and write the adjusted transmit data to the memory; change a field in the transmit data to indicate that the transmit data has been adjusted; disregard the transmit performance information if the field indicates that the transmit data has been adjusted; and determine whether transmit data was adjusted while a data frame was queued.

Other systems, methods, and features of embodiment of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

The disclosure can be better understood with reference to the following drawings and description. The components in the figures are not necessarily to scale, emphasis instead being placed upon illustrating the principles of the invention.

Moreover, in the figures, like referenced numerals designate corresponding parts or elements throughout the different views.

The embodiments below relate to a technique for providing transmit parameters associated with a data frame to a buffer in communication with a data transmitter. The technique also includes providing multiple sets of transmit parameters to the buffer so that the data transmitter may retransmit the data frame using different sets of transmit parameters, if necessary. More specifically, the technique includes adjusting the number of levels of transmit parameters in transmit data (in a transmit control table) based on the performance of the data transmitter. Any number of levels may be implemented, and adjusted transmit data may be written to the buffer. The data transmitter determines whether an additional (successive) level exists by reading a continuation bit of the current level.

The technique provides an efficient use of the buffer (and read/write cycles to the buffer) and flexibility to implement transmit control tables of different sizes. For example, a transmit control table of a first size may be used to transmit data frames to a first destination/client, and a transmit control table of a second size may be used to transmit data frames to a second destination/client. The size of either transmit control table may be adjusted to improve the performance of the data transmitter. The technique also provides flexibility that allows transmit parameters of a transmit control table to be adjusted and written to the buffer, even if the associated data frame is currently being transmitted using the transmit parameters of the transmit control table. The transmit parameters of a level may be adjusted and additional levels may be added according to an algorithm that incorporates data and success/failure rates of previous transmission attempts, as an example.

Figure 1:
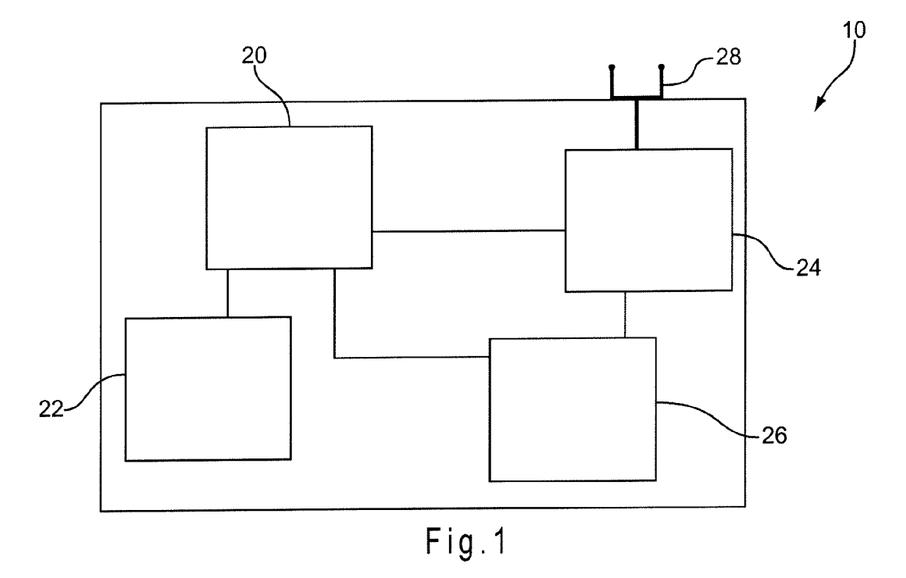
FIG. 1 is an illustration of a device that includes a data transmitter that accesses levels of data frame transmit parameters in accord with an embodiment of the invention.

FIG. 1 is an illustration of a device 10 that transmits data for receipt by one or more other devices (not shown). The device 10 may be a cell phone, personal digital assistant, computer, peripheral device, or any other device that transmits data. The device 10 may transmit data in accord with the Institute of Electrical and Electronics Engineers standard 802.11a/b/g/n HT (high-throughput) or other standard by way of a wireless or wired data communication channel, as examples.

The device 10 includes a processor 20, such as a firmware processor, in communication with data memory 22. For transmitting a data frame, the processor 20 retrieves the data frame from the data memory 22 and communicates the data frame to a memory location in a buffer 26. The processor 20 also communicates the memory location of the data frame to a data transmitter 24. The data transmitter 24 may be a media access control (MAC) hardware device, as an example. The data transmitter 24 communicates transmission signals to a signal transmitter 28, such as an antenna (as shown) or other device that outputs communication signals for transmission by way of a wireless or wired communication channel.

Figure 2:
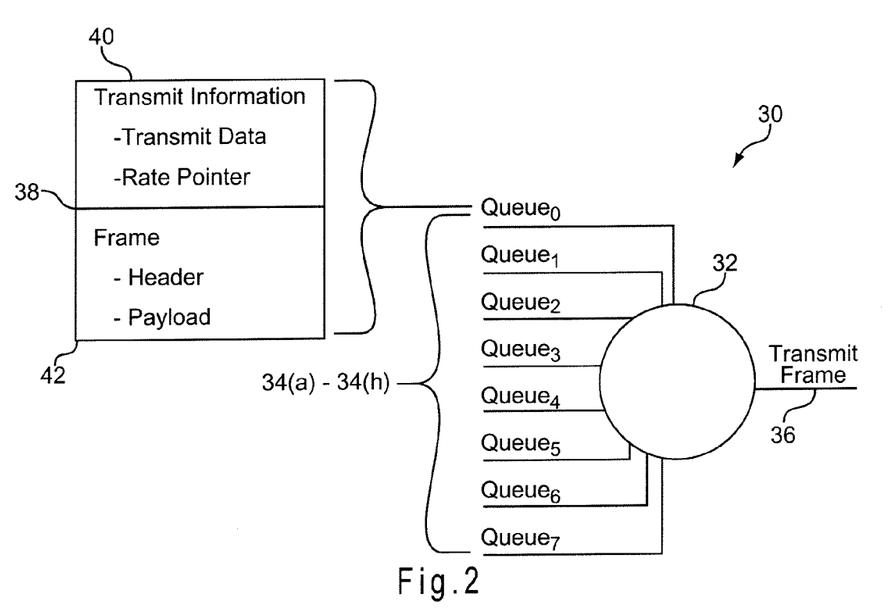
FIG. 2 is an illustration of a function of the data transmitter of FIG. 1.

FIG. 2 illustrates a version of a data transmitter 30 that receives memory locations of transmit frames (e.g., transmit frame 38) selected by a processor (such as processor 20) for transmission. The memory locations of the transmit frames are received at one or more queues of the data transmitter 30. In the illustrated embodiment, the data transmitter 30 has eight queues 34(a)-34(h). A scheduler 32 selects individual queues for transmission. The memory location of a transmit frame associated with a selected queue is communicated to a transmit frame output terminal 36 for communication to data frame transmission hardware (not shown) of the data transmitter 30. As illustrated in FIG. 2, a transmit frame 38 includes a transmit information header 40 that includes both transmit data and a rate pointer to a memory location having transmit parameters for the selected frame 38. The transmit frame 38 also includes the data frame, including both the header and payload.

Figure 3:
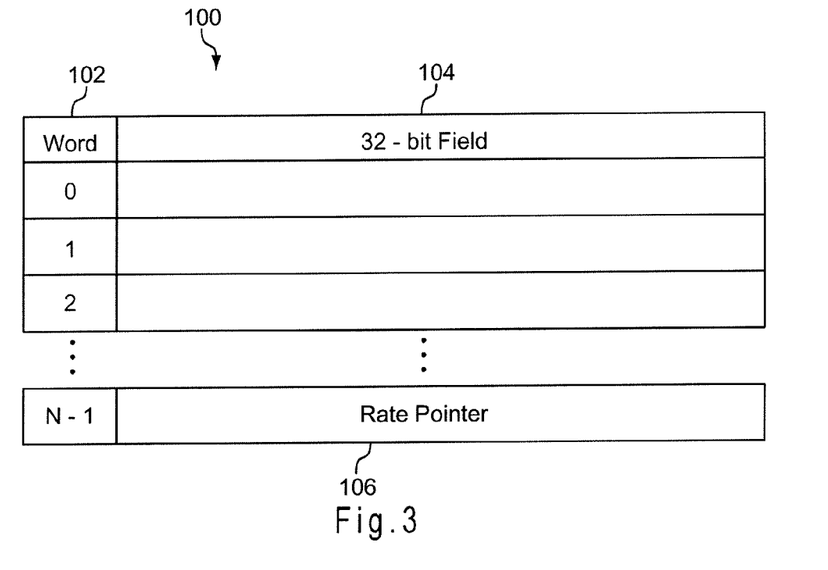
FIG. 3 is an illustration of an embodiment of a transmit information data structure that may be implemented by the device of FIG. 1.

FIG. 3 is an illustration of an embodiment of the data structure of a transmit information header 100. The transmit information header 100 includes N words 102. In one version, each word is associated with a 32-bit field 104. A transmit information header 100 is written to the data buffer 26 by the processor 20 for each transmit frame sent to the queues 34(a)-34(h). At the data buffer 26, the fields of the transmit information header 100 may be written to and read from by both the processor 20 and the data transmitter 24. Exemplary fields of a transmit information header 100 are described in Table 1. A function implemented by software (as indicated in the table) may be performed by the processor 20, as an example. A function performed by hardware may be performed by the data transmitter 24, as an example.

TABLE 1

Exemplary Transmit Information Header Fields
(SW = Software; HW = Hardware)

| Field Name | Description |
| --- | --- |
| Maximum Transmit Attempts Allowed | SW sets this field to the maximum number of attempts that may be made to send the data frame if ACK is not received. |
| Transmit Attempts | HW writes to this field the number of transmission attempts made for the data frame. |
| Transmit Status | HW writes the status of the data frame: 0 = successfully transmitted; 1 = frame dropped |
| Frame Address | SW writes the memory location of the data frame. |
| Transmit Parameter Source | SW writes to this field to indicate whether to use transmit parameters indicated in this table, or to use the transmit parameters from a transmit control table: 0 = use transmit parameters from this table; 1 = use transmit parameters from transmit control table. |
| Transmit Parameters | SW sets transmit parameters of this table. Examples of transmit parameters include: transmit rate; transmit bandwidth; which antenna to select; transmit power setting; whether to enable high-throughput. |
| Transmit Control Table Pointer | SW sets this field to point to the memory location of the transmit control table. |
| Transmit Level | Indicates which table entry (retry level) to use in the transmit control table for the next transmission attempt. Updateable by HW to indicate the offset of the next level to be used. |
| Transmit Level Count | Number of transmission attempts made at the current table entry (retry level) in the transmit control table. Updateable by HW after each transmission attempt at a level. |

Table 1 shows that the transmit information header 100 includes data pertaining to transmission attempts allowed and made, the status of a transmission attempt, the location of a data frame, and where to obtain the transmit parameters for the current attempt. In the embodiment discussed above, the transmit parameters may be obtained either directly from a transmit information header field or from a transmit control table, depending on the status of the Transmit Parameter Source field. If the transmit parameters for a queued data frame are obtained from the transmit information header field, they are fixed for all transmission attempts when the transmit information header field is written to the data buffer 26. If the transmit parameters for a queued data frame are obtained from a transmit control table, they are adaptable because an adjusted transmit control table may be written to the data buffer 26 as/when needed. A portion (referred to as "level") of the transmit control table for a queued frame may be updated by the processor 20 (in memory 22) at any time before the transmit control table is written to the data buffer 26. The processor 20 may also add levels to the transmit control table.

The memory location of a level of the transmit control table is determined by the data transmitter 24 based on the transmit control table pointer and the transmit level fields in the transmit information header. For example, the first level of the transmit control table is at the memory location indicated in the transmit control table pointer field. The second level is at the memory location indicated by the sum of the transmit control table pointer field and an address offset determined based on the transmit level field of the transmit information header. If the offset is equal to the size of a level of the transmit control table, then the memory location of the second level is based on the sum of the transmit control pointer and the offset (multiplied by one).

Figure 4:
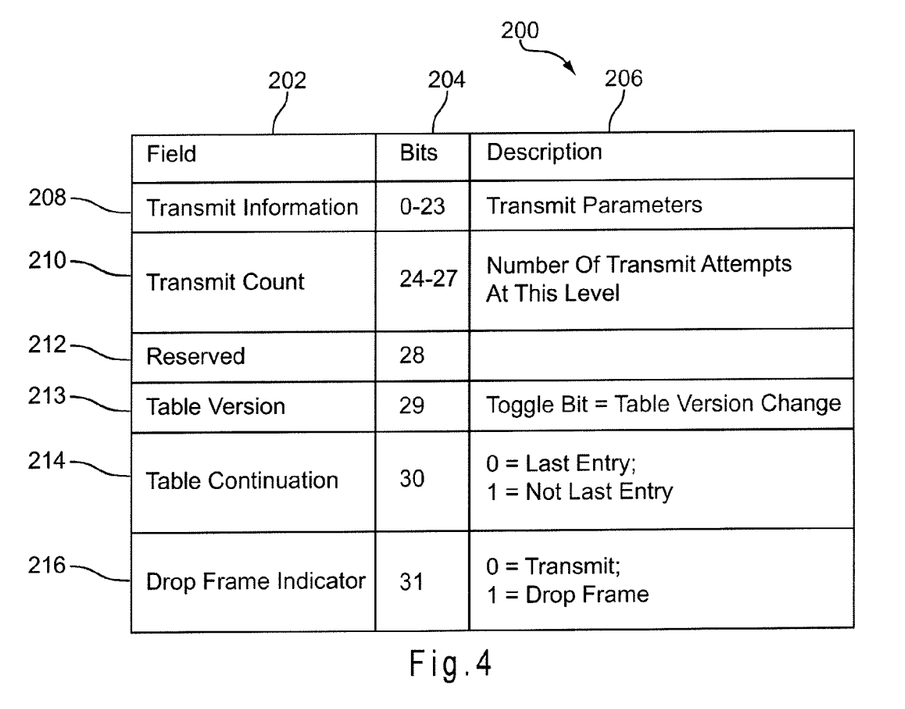
FIG. 4 is an illustration of an embodiment of one level of a transmit control table, having data frame transmit parameters, that is accessed by the data transmitter of FIG. 1.

An embodiment of a transmit control table 200 is shown in FIG. 4. Although the illustrated transmit control table 200 includes six fields 202 totaling 32 bits (204), the actual size of the transmit control table 200 is flexible because the transmit control table 200 may include additional levels. Each additional level would also include the six fields 202, but the data of each field 202, including the transmit information 208, may be different from level to level. A table continuation bit 214 is set to zero if the transmit control table 200 does not include an additional level beyond the current level, and is set to one if there is at least one additional level. Thus, the data transmitter 24 determines whether there is an additional level to be read from the data buffer 26 (or any memory that includes the transmit control table 200) based on the table continuation bit 214. In this embodiment, only the level of the transmit control table 200 that is needed for the current transmission attempt (or retry) is read by the data transmitter from the data buffer 26 (or other memory). The processor 20 may update/adjust the transmit parameters of any level before the transmit control table 200 is written from the memory 22 to the buffer 26. The processor 20 may update/adjust transmit parameters in memory 22 based on the results of other transmission attempts, as an example. Further, the processor 20 may increase the number of levels of the transmit control table 200. For example, the processor 20 may add a level to the transmit control table 200 even as the data transmitter 24 is transmitting a corresponding data frame using the parameters of a level of the transmit control table 200.

In the embodiment illustrated in FIG. 4, the transmit control table 200 includes a transmit information field 208 that has the transmit parameters for the respective level. The transmit parameters may define one or more of the transmit rate; transmit bandwidth; which antenna to select; transmit power setting; and whether to enable high-throughput, as examples. In an embodiment, the transmit information field 208 defines the parameters shown in Table 2.

TABLE 2

Transmit Parameters of Transmit Control Table

| Parameter | Description |
| --- | --- |
| Format | 0 = Legacy (IEEE 802.11b or 802.11g); |
|  | 1 = Hi-Throughput (IEEE 802.11n) |
| Guard Interval | 0 = Standard Guard Interval; |
|  | 1 = Short Guard Interval |
| Bandwidth | 0 = 20 MHz channel; 1 = 40 MHz channel |
| Transmit Rate | Legacy or Hi-Throughput |
| Encoding | 0 = Basic Coding; 1 = Advanced Coding |
| Antenna Select 1 | Select Antenna 0 and/or Antenna 1 |
| Sub-Channel | 00 = Use lower sub-channel in the 40 MHz channel |
| Activation | 01 = Use upper sub-channel in the 40 MHz channel |
|  | 1x = Identical transmission on both upper and lower 40 MHz sub-channels |

TABLE 2-continued

Transmit Parameters of Transmit Control Table

| Parameter | Description |
| --- | --- |
| Preamble | 0 = Transmit Using Long Preamble |
|  | 1 = Transmit Using Short Preamble |
| Power | 4-bit power index to select transmit power setting |
| Antenna Select 2 | 1 = Select Antenna 2 |
| Beamforming | 1 = Increase power in direction of receiver |

As discussed above, if the transmit parameter source field of the transmit information header (Table 1) is set to zero, the transmit parameters from Table 1 are used. If the transmit parameter source field is set to one, the transmit parameters from the transmit control table (Table 2) are used.

The transmit control table 200 includes a transmit count field 210 that defines the total number of transmit attempts (first attempt plus the number of retries) that may be made at the current level if an ACK signal is not received. The data transmitter 24 compares the transmit count field 210 to the transmit level count field of the transmit information header to determine whether there is another level of the transmit control table 200. For example, if the transmit count field 210 is equal to the transmit level count field (e.g., eight transmit attempts allowed at this level), the data transmitter 24 uses the table continuation bit 214 to determine whether there is another level. In one version, the transmit count field 210 for the last level is reserved. Instead, the number of transmission attempts allowed at the last level is determined by subtracting the sum of the transmit counts 210 for all previous levels of the transmit control table 200 from the Maximum Transmit Attempts Allowed field of Table 1.

The transmit control table 200 also includes a reserved field 212, a table version field 213, and a drop frame indicator field 216. The reserved field 212 may be used for any purpose requiring one or two bits. The table version field 213 is a single bit that is toggled by the processor 20 for all levels of a transmit control table 200 whenever at least one parameter of any level is changed or if a level is added to the transmit control table 200. For each frame, the data transmitter 24 copies, as transfer information, the table version field 213 bit for each level attempted. After the frame is transmitted, the processor 20 reads the bit for each level from the transfer information provided by the data transmitter 24. If the bit toggled between any two levels the processor 20 disregards the frame when calculating the performance of the transmission because the frame was transmitted using parameters from two different versions of the transmit control table 200.

The drop frame indicator field 216 is set by the processor 20 to zero to allow a data frame to be transmitted, and is set to one to indicate that the data frame is not to be transmitted. The processor 20 may use the drop frame indicator field 216 to "delete" a frame after it has been queued but before it has been fetched from the queue by the data transmitter 24.

Use of the transmit control table 200 may be disabled on a frame-by-frame basis or globally (i.e., for all frames). To disable use of the transmit control table 200 for a frame, a reserved "drop-transmit-control" bit in the buffer 26 is set to one by the processor 20. To disable use of the transmit control table 200 globally, a reserved bit in the buffer 26 "global-drop bit" is set to one by the processor 20. If use of the transmit control table 200 is disabled, the data transmitter 24 uses the transmit parameters from the transmit information header (FIG. 3 and Table 1).

Figure 5:
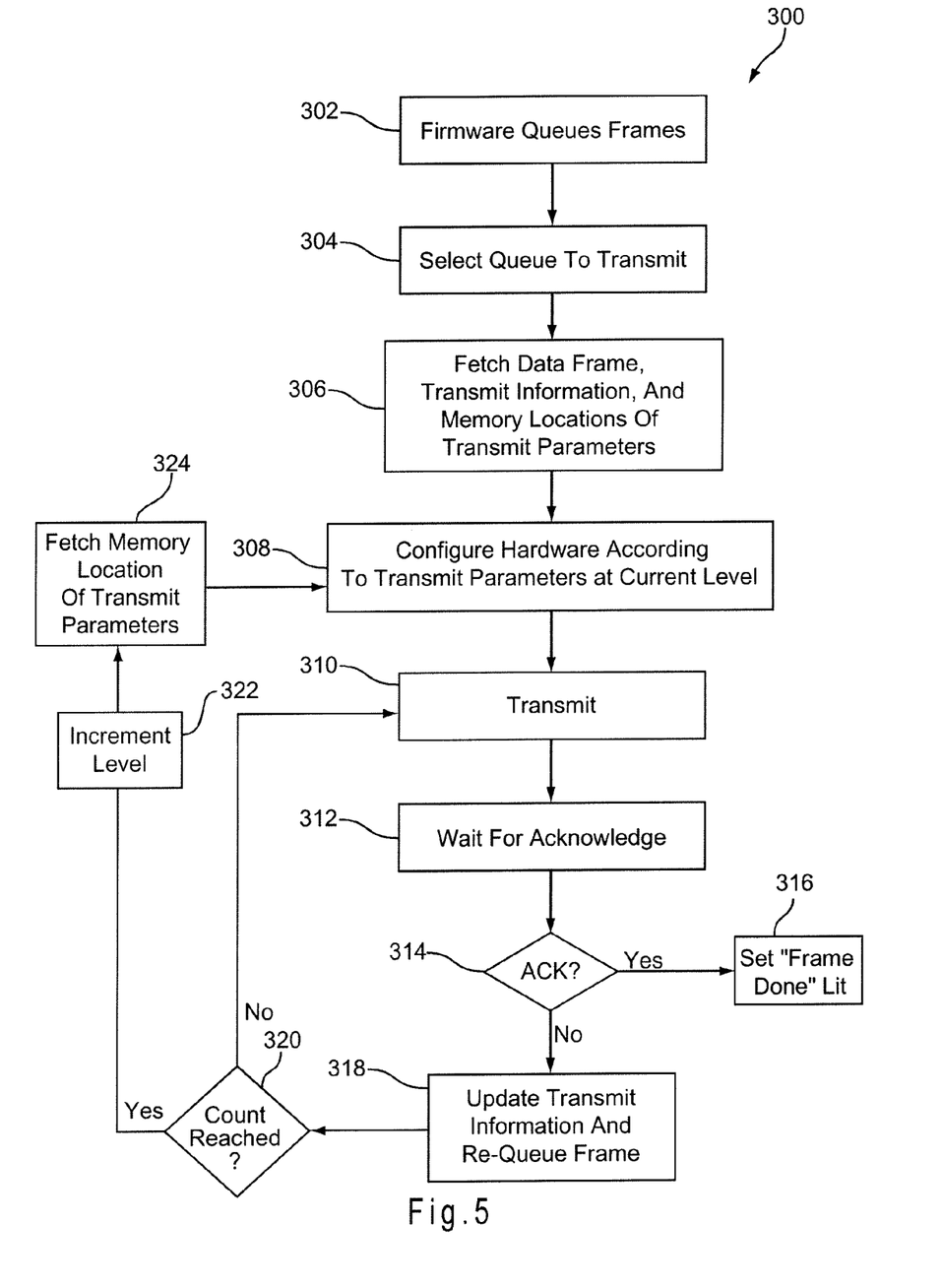
FIG. 5 shows acts for communicating a data frame and transmit parameters to a data transmitter, in accord with an embodiment of the invention.

FIG. 5 shows acts for communicating a data frame and transmit parameters to a data transmitter, in accord with an embodiment of the invention. A processor queues transmit frames to the data transmitter (Act 302). The data transmitter selects a queued frame for transmission (Act 304) and fetches the data frame, the transmit information, and a memory location of the transmit parameters for the selected frame (Act 306). The data transmitter is configured with the transmit parameters of the current level (Act 308). The data transmitter transmits the data frame (Act 310) and waits for an acknowledge (ACK) signal from the receiver (Act 312). If an ACK signal is received (Act 314), a data element (e.g., bit) in the transmission information header is set to indicate that the frame was transmitted (Act 316). If an ACK signal is not received (Act 314), the data transmitter updates the transmit information associated with the data frame and re-queues the data frame (Act 318). In this case, at some time afterward the scheduler selects the data frame for transmission and, if the count has not been reached at the current transmission level (Act 320), the data frame is retransmitted using the transmit parameters of the current level. If the count has been reached (Act 320), the transmission level is incremented (Act 322), the memory location of the transmit parameters for the next level are fetched (Act 324), the data transmitter is configured according to the transmit parameters of that level (Act 308), and subsequent Acts are performed, as shown.

Figure 6A:
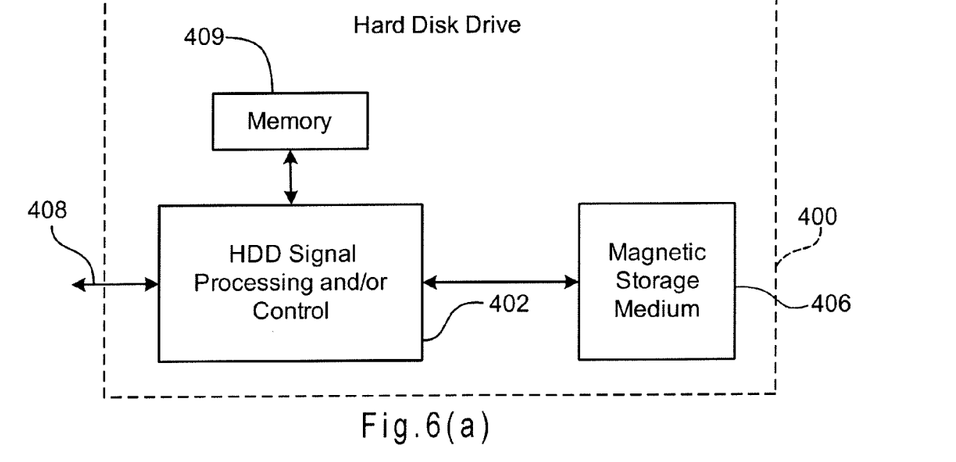
FIG. 6(a) is a functional block diagram of a hard disk drive.

Referring now to FIGS. 6(a) to 6(h), various exemplary implementations of the present invention are shown. Referring to FIG. 6(a), the present invention may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present invention may be implemented with either or both signal processing and/or control circuits, which are generally identified in FIG. 6(a) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Figure 6B:
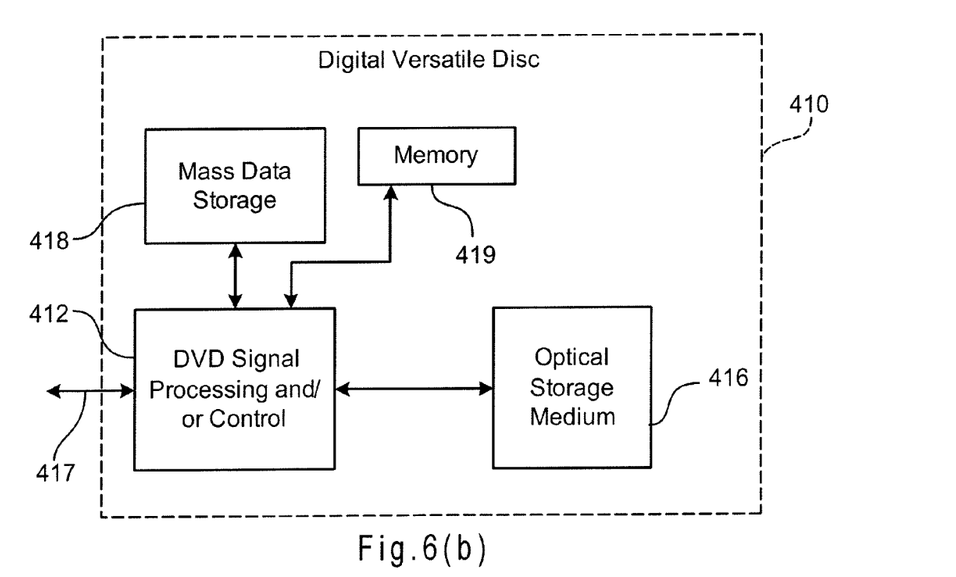
FIG. 6(b) is a functional block diagram of a digital versatile disk (DVD)

Referring now to FIG. 6(b), the present invention may be implemented in a digital versatile disc (DVD) drive 410. The present invention may be implemented in either or both signal processing and/or control circuits, which are generally identified in FIG. 6(b) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 6(a). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Figure 6C:
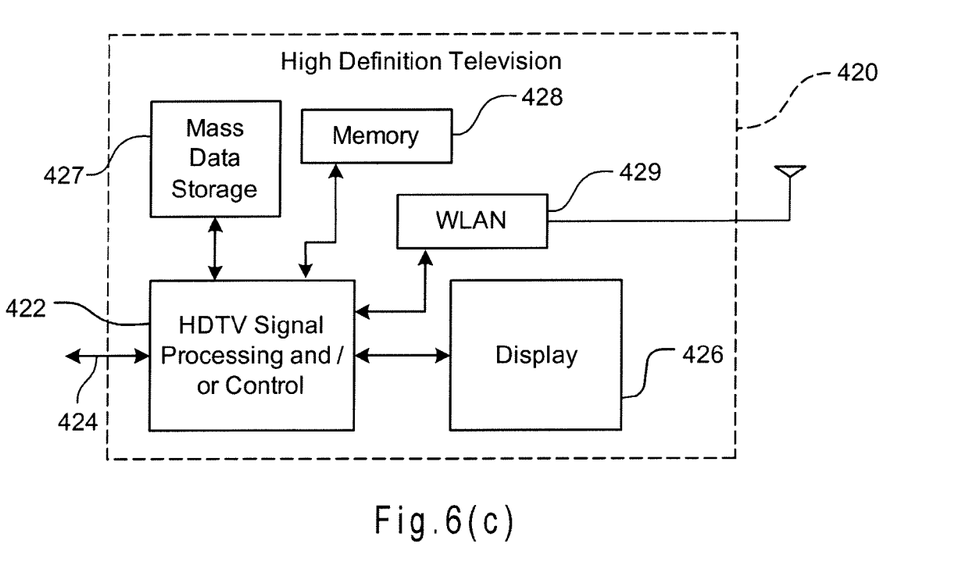
FIG. 6(c) is a functional block diagram of a high definition television.

Referring now to FIG. 6(c) the present invention may be embodied in a high definition television (HDTV) 420. The present invention may be implemented in either or both signal processing and/or control circuits, which are generally identified in FIG. 6(c) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in either FIG. 6(a) and/or at least one DVD may have the configuration shown in FIG. 6(b). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Figure 6D:
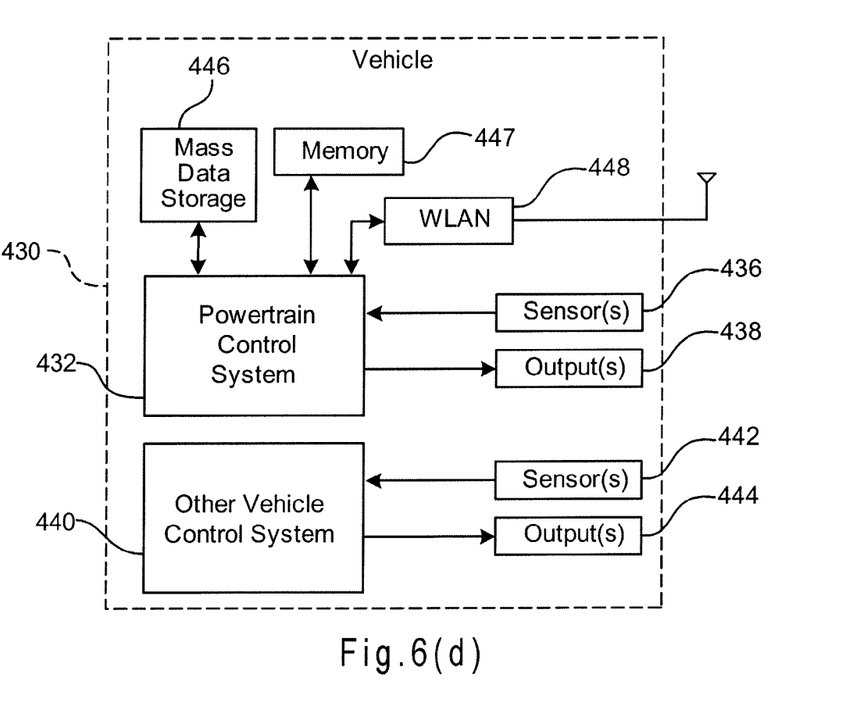
FIG. 6(d) is a functional block diagram of a vehicle control system.

Referring now to FIG. 6(d), the present invention may be implemented in a control system of a vehicle 430, a WLAN interface 448 and/or mass data storage 446 of the vehicle control system. In some implementations, the present invention is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

The present invention may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 6(a) and/or at least one DVD may have the configuration shown in FIG. 6(b). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Figure 6E:
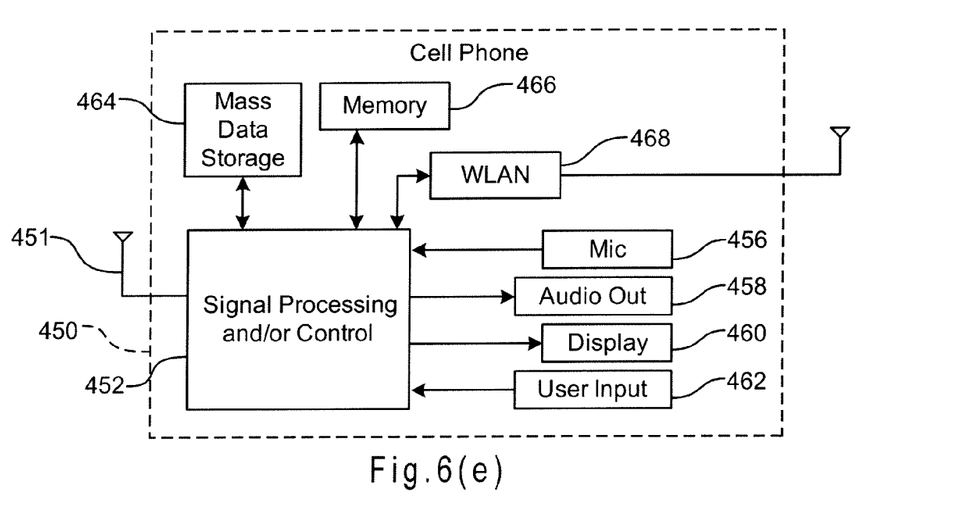
FIG. 6(e) is a functional block diagram of a cellular phone.

Referring now to FIG. 6(e), the present invention may be embodied in a cellular phone 450 that may include a cellular antenna 451. The present invention may be implemented in either or both signal processing and/or control circuits, which are generally identified in FIG. 6(e) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 6F:
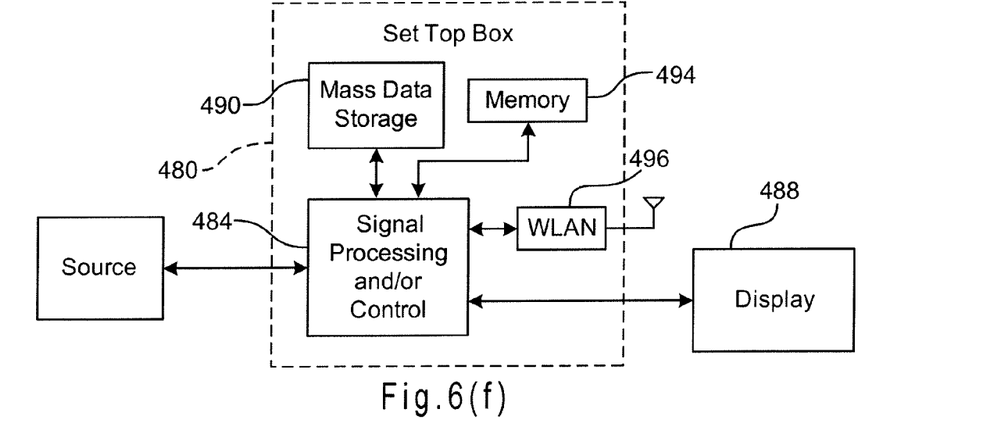
FIG. 6(f) is a functional block diagram of a set top box.

Referring now to FIG. 6(f), the present invention may be embodied in a set top box 480. The present invention may be implemented in either or both signal processing and/or control circuits, which are generally identified in FIG. 6(f) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 6G:
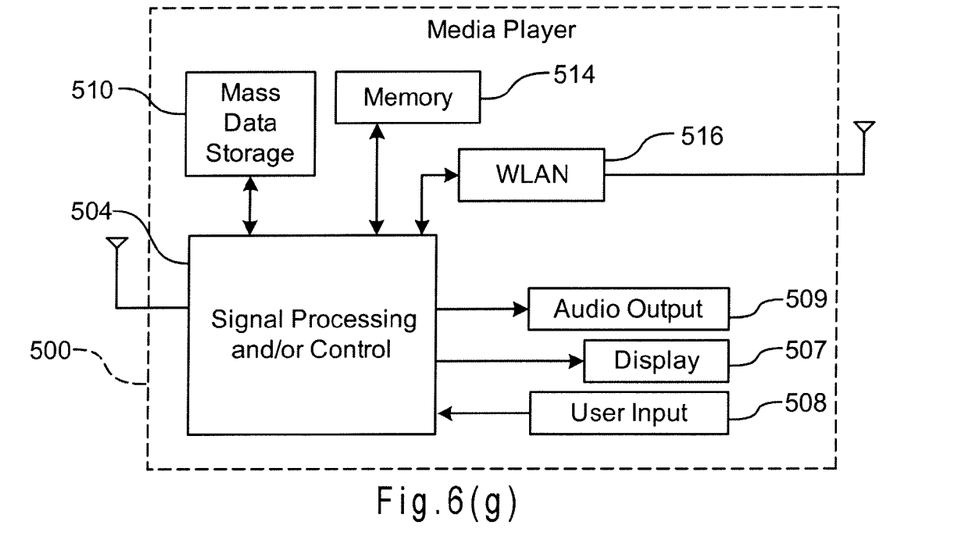
FIG. 6(g) is a functional block diagram of a media player.

Referring now to FIG. 6(g), the present invention may be embodied in a media player 500. The present invention may be implemented in either or both signal processing and/or control circuits, which are generally identified in FIG. 6(g) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8".

Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 6H:
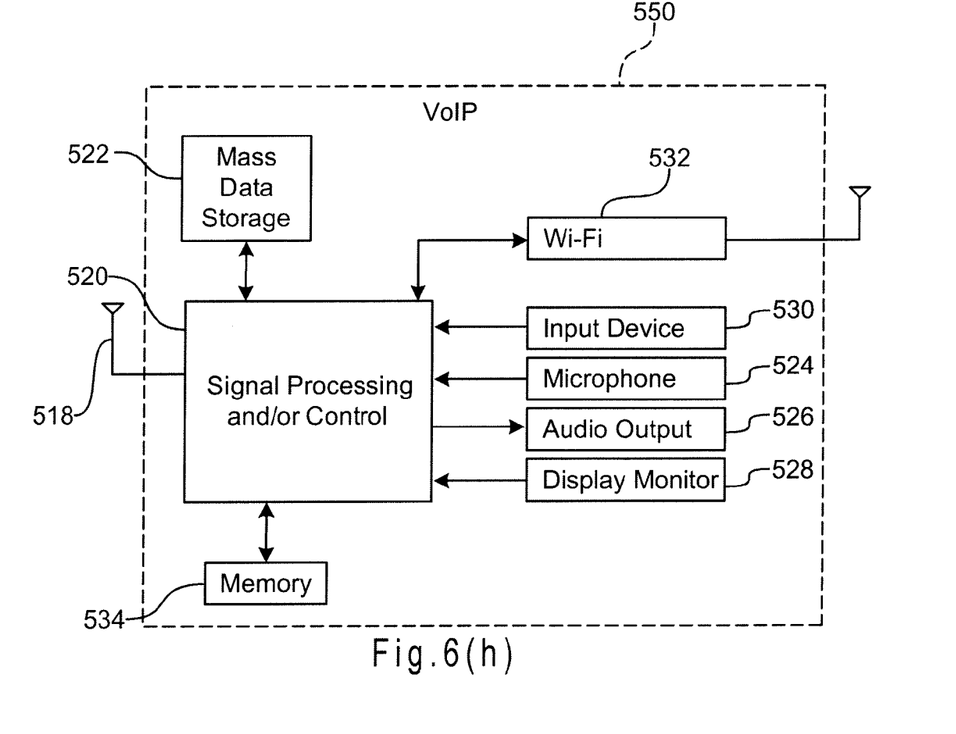
FIG. 6(h) is a functional block diagram of a VoIP phone.

Referring to FIG. 6(h), the present invention may be embodied in a Voice over Internet Protocol (VoIP) phone 550 that may include an antenna 518. The present invention may be implemented in either or both signal processing and/or control circuits, which are generally identified in FIG. 6(h) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is conFIG.d to establish communications link with a VoIP network (not shown) via Wi-Fi communication module 532.

All of the discussion above, regardless of the particular implementation being described, is exemplary in nature, rather than limiting. Although specific components of the transmission device are described, methods, systems, and articles of manufacture consistent with the transmission device may include additional or different components. For example, components of the transmission device may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the transmission device may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the transmission device may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method comprising:
storing, by a processor, a first set of transmit parameters to a first memory location of a buffer and a second set of transmit parameters to a second memory location of the buffer, wherein the first set of transmit parameters and the second set of transmit parameters are associated with a data frame, wherein the first set of transmit parameters includes a continuation parameter that indicates an availability of the second set of transmit parameters, and wherein the first set of transmit parameters defines values for a first parameter and a second parameter and the second set of transmit parameters defines different values for the first parameter and the second parameter;
queuing, by the processor, a transmit frame for transmission by a data transmitter, wherein the transmit frame includes a transmit information header that includes a pointer to a memory location of a data frame, a pointer to the first memory location, and a current retry level;
retrieving, by the data transmitter, the transmit frame;
determining, by the data transmitter, a first address based on the pointer to the first memory location and the current retry level, wherein the first address corresponds to the first memory location of the buffer;
retrieving, by the data transmitter, the first set of transmit parameters from the determined first address after the first set of transmit parameters and the second set of transmit parameters are stored by the processor;
setting transmission parameters of the data transmitter to match the values for the first and the second parameters defined in the first set of transmit parameters;
transmitting, by the data transmitter, the data frame;
when an acknowledge signal is not received in response to transmitting the data frame in accordance with the first set of transmit parameters, determining, by the data transmitter, whether the first set of transmit parameters includes the continuation parameter;
if the first set of transmit parameters includes the continuation parameter; incrementing the current retry level;
determining, by the data transmitter, a second address based on the incremented current retry level and the first memory location, wherein the second address corresponds to the second memory location of the buffer;
retrieving, by the data transmitter, the second set of transmit parameters from the determined second address; and
setting the transmission parameters of the data transmitter to match the different values for the first and second parameters defined in the second set of transmit parameters.

2. The method of claim 1 further comprising queuing, by the processor, the data frame in the data transmitter and adjusting transmit data that includes the first set of transmit parameters and the second set of transmit parameters while the data frame is queued.

3. The method of claim 2 further comprising:
adjusting, by the processor, the second set of transmit parameters while the data frame is queued in accord with the first set of transmit parameters; and
recording an indication that the second set of transmit parameters has been adjusted by setting an indication parameter of the second set of transmit parameters.

4. The method of claim 1 further comprising adding, by the processor, additional sets of transmit parameters associated with the data frame to the buffer.

5. The method of claim 1 further comprising:
incrementing, by the data transmitter, a transmit attempt count parameter of the first set of transmit parameters after transmitting the data frame in accord with the first set of transmit parameters;
comparing, by the data transmitter, the transmit attempt count parameter to a transmit count parameter of the first set of transmit parameters, wherein the transmit count parameter indicates a maximum number of transmit attempts allowed with the first set of transmit parameters; and
determining, by the data transmitter, the availability of the second set of transmit parameters by reading the continuation parameter of the first set of transmit parameters when the transmit attempt count parameter equals the transmit count parameter.

6. The method of claim 1 further comprising:
adding, by the processor, additional sets of transmit parameters to a transmit control table that includes the first set of transmit parameters and the second set of transmit parameters; and
writing, by the processor, the transmit control table to the buffer, including the additional level.

7. An apparatus comprising:
a processor configured to:
store a first set of transmit parameters to a first memory location of a buffer and a second set of transmit parameters to a second memory location of the buffer, wherein the first set of transmit parameters and the second set of transmit parameters are associated with a data frame, wherein the first set of transmit parameters includes a continuation parameter that indicates the availability of the second set of transmit parameters, wherein the first set of transmit parameters defines values for a first and a second parameter and the second set of transmit parameters defines different values for the first and the second parameter; and
queuing, by the processor, a transmit frame for transmission by a data transmitter, wherein the transmit frame includes a transmit information header that includes a pointer to a memory location of a data frame, a pointer to the first memory location, and a current retry level; and a data transmitter configured to:
retrieve the transmit frame;
determine a first address based on the pointer to the first memory location and the current retry level, wherein the first address corresponds to the first memory location of the buffer;
retrieve the first set of transmit parameters from the determined first address after the processor stores the first set of transmit parameters and second set of transmit parameters,
set transmission parameters to match the values for the first and the second parameters defined in the first set of transmit parameters;
transmit the data frame for transmission in accord with the first set of transmit parameters,
determine whether the second set of transmit parameters is available by reading the continuation parameter of the first set of transmit parameters when an acknowledge signal is not received in response to transmitting the data frame in accord with the first set of transmit parameters; and
if the second set of transmit parameters is determined to be available:
increment the current retry level;
determine a second address based on the incremented current retry level and the first memory location, wherein the second address corresponds to the second memory location of the buffer;
retrieve the second set of transmit parameters from the determined second address; and
set the transmission parameters to match the different values for the first and second parameters defined in the second set of transmit parameters.

8. The apparatus of claim 7 wherein the processor is configured to write to the buffer a transmit control table comprised of the first set of transmit parameters and the second set of transmit parameters.

9. The apparatus of claim 7 wherein the processor is configured to adjust parameters of the second set of transmit parameters while the data frame is queued.

10. The apparatus of claim 7 wherein the data transmitter is configured to:
increment a transmit attempt count parameter of the first set of transmit parameters after transmitting the data frame in accord with the first set of transmit parameters, compare the transmit attempt count parameter to a transmit count parameter of the first set of transmit parameters, wherein the transmit count parameter indicates a maximum number of transmit attempts allowed with the first set of transmit parameters, and, determine whether a transmit control table includes the second set of transmit parameters by reading the continuation parameter of the first set of transmit parameters when the transmit attempt count parameter equals the transmit count parameter.

11. The apparatus of claim 7 wherein the processor is configured to add a subsequent set of transmit parameters to a transmit control table that includes the first set of transmit parameters and the second set of transmit parameters.

12. A method of transmitting data frames associated with transmit parameters comprising:
storing, by a processor, a first set of transmit parameters to a first memory location of a buffer, wherein the first set of transmit parameters defines values for a first and a second parameter;
queuing, by the processor, a transmit frame for transmission by a data transmitter, wherein the transmit frame includes a transmit information header that includes a pointer to a memory location of a data frame, a pointer to the first memory location, and a current retry level;
retrieving, by the data transmitter, the transmit frame;
determining, by the data transmitter, a first address based on the pointer to the first memory location and the current retry level, wherein the first address corresponds to the first memory location of the buffer;
setting transmission parameters of the data transmitter to match the values for the first and the second parameters defined in the first set of transmit parameters stored at the first address;
transmitting, by the data transmitter, a first data frame according to the first set of transmit parameters;
storing, by a processor, a second set of transmit parameters to a second memory location of a buffer while the data transmitter transmits the first data frame according to the first set of transmit parameters, wherein the second set of transmit parameters defines different values for the first and the second parameter;
setting a continuation parameter of the first set of transmit parameters that indicates an availability of the second set of transmit parameters;
reading, by the data transmitter, the continuation parameter of the first set of transmit parameters to determine the availability of the second set of transmit parameters;
if the second set of transmit parameters is determined to be available;
incrementing the current retry level;
determining a second address based on the incremented current retry level and the first memory location, wherein the second address corresponds to the second memory location of the buffer;
retrieve, by the data transmitter, the second set of transmit parameters from the second address;
setting the transmission parameters of the data transmitter to match the different values for the first and second parameters defined in the second set of transmit parameters; and
transmitting, by the data transmitter, a second data frame according to the second set of transmit parameters.

13. The method of claim 12 further comprising:
determining transmit performance information associated with the transmission of the first data frame according to the first set of transmit parameters while the first data frame is transmitted;
wherein the second set of transmit parameters are generated at least in part based on the determined transmit performance information.

14. The method of claim 13 further comprising changing a parameter in transmit data that includes one or more sets of transmit parameters after the second set of transmit parameters is stored to indicate that the transmit data has been adjusted.

15. The method of claim 14 further comprising disregarding the transmit performance information if the field indicates that the parameter in the transmit data has been adjusted.

16. The method of claim 14 further comprising:
determining whether the transmit data was adjusted while the first data frame was queued.

17. An apparatus comprising:
a processor configured to:
- store a first set of transmit parameters to a first memory location of a buffer;
- store a second set of transmit parameters to a second memory location of the buffer, wherein the first set of transmit parameters includes a continuation parameter that indicates an availability of the second set of transmit parameters and the processor is further configured to set the continuation parameter to indicate the availability of the second set of transmit parameters, and wherein the first set of transmit parameters defines values for a first and a second parameter and the second set of transmit parameters defines different values for the first and the second parameter; and
- queue a transmit frame for transmission by a data transmitter, wherein the transmit frame includes a transmit information header that includes a pointer to a memory location of a data frame, a pointer to the first memory location, and a current retry level;

a data transmitter configured to:
- retrieve the transmit frame;
- determine a first address based on the pointer to the first memory location and the current retry level, wherein the first address corresponds to the first memory location of the buffer;
- retrieve the first set of transmit parameters from the determined first address;
- transmit a first data frame according to the values of the first and second parameters defined in the first set of transmit parameters while the processor stores the second set of transmit parameters to the second memory location of the buffer;
- when an acknowledge signal is not received in response to transmission of the first data frame, and if the second set of transmitter parameters is determined to be available, increment the current retry level;
- determine a second address based on the incremented current retry level and the first memory location, wherein the second address corresponds to the second memory location of the buffer;
- retrieve the second set of transmit parameters from the determined second address; and
- transmit the first data frame according to the different values of the first and second parameters defined in the second set of transmit parameters.

18. The apparatus of claim 17 wherein
the processor determines transmit performance information associated with transmission of the first data frame according to the first set of transmit parameters while the first data frame is transmitted according to the first set of transmit parameters and generates the second set of transmit parameters at least in part based on the determined transmit performance information.

19. The apparatus of claim 17 wherein the processor changes a parameter in transmit data that includes one or more sets of transmit parameters after the second set of transmit parameters is stored to indicate that the transmit data has been adjusted.

20. The apparatus of claim 19 wherein the processor disregards transmit performance information if the parameter indicates that the transmit data has been adjusted.

\* \* \* \* \*